United States Patent [19]

Shaw et al.

[11] Patent Number: 5,498,304
[45] Date of Patent: Mar. 12, 1996

[54] METHOD OF MANUFACTURING CORRUGATED BOARD USING A THERMAL RADIANT ENERGY SOURCE

[75] Inventors: Neil W. Shaw, Ivanhoe; Zsolt V. Padanyi, Nunawading; Frederick J. Mutimer, Lower Plenty, all of Australia

[73] Assignee: Amcor Ltd., South Melbourne, Australia

[21] Appl. No.: 190,146

[22] PCT Filed: Aug. 18, 1992

[86] PCT No.: PCT/AU92/00439

§ 371 Date: Feb. 4, 1994

§ 102(e) Date: Feb. 4, 1994

[87] PCT Pub. No.: WO93/03913

PCT Pub. Date: Mar. 4, 1993

[30] Foreign Application Priority Data

Aug. 19, 1991 [AU] Australia ................. PK 7849
Dec. 10, 1991 [AU] Australia ................. PK 9949

[51] Int. Cl.$^6$ ................. B31F 1/24; B32B 31/26
[52] U.S. Cl. ................. 156/210; 156/205; 156/272.2; 156/275.5; 156/380.9
[58] Field of Search ................. 156/205, 210, 156/380.9, 272.2, 275.7

[56] References Cited

U.S. PATENT DOCUMENTS

| H556 | 12/1988 | Tarko | 156/380.9 |
|---|---|---|---|
| 3,660,200 | 5/1972 | Anderson et al. | 156/278 |
| 4,169,007 | 9/1979 | Pray | 156/210 |
| 4,589,944 | 5/1986 | Torti et al. | 156/359 |
| 4,950,348 | 8/1990 | Larsen | 156/380.9 |
| 5,035,045 | 7/1991 | Bowen et al. | 156/380.9 |

FOREIGN PATENT DOCUMENTS

| 89/09127 | 10/1989 | WIPO. | |
|---|---|---|---|
| 90/00970 | 2/1990 | WIPO | 156/380.9 |

*Primary Examiner*—Michele K. Yoder
*Attorney, Agent, or Firm*—Bucknam and Archer

[57] ABSTRACT

Corrugated paperboards are prepared for corrugation and adhesive bonding of mediums and liners by exposing the mediums liners and adhesives to radiant energy from a thermal source ranging from 1100° C. to 2300° C. and emitting a dominant wavelength in the range of 2.1 to 1.0 microns. The speed of adhesive bond development is increased. Polymeric adhesives may be used as alternatives to conventional starch based adhesives.

9 Claims, 3 Drawing Sheets

Prior Art

METHOD OF MANUFACTURING CORRUGATED BOARD USING A THERMAL RADIANT ENERGY SOURCE

FIELD OF THE INVENTION

This invention relates to an improved method of bonding liner boards to corrugated mediums in the manufacture of corrugated board for box manufacture.

BACKGROUND OF THE INVENTION

Conventionally, in applying liners to corrugated medium the first liner is applied at the single facer to form a single faced board and this is achieved by applying adhesive to the flute tips while the medium is contained on the corrugating roll and then applying the liner under pressure and heat. The combination of heat from the corrugating roll and pressure roll and mechanical pressure itself forms the first liner to medium bond. Subsequently, the single face board is passed to a double facer or double backer where adhesive is applied to flute tips and the board passed over a series of steam heated platens to bond the second liner. Pressure is also applied by a transport belt on top of the board and a series of small rollers riding on that belt. Travel of the double face board through the double facer or double backer is assisted by sandwich belts after the steam heated platens.

The size of the plant and the length of the production floor is quite long in conventional plant for producing corrugated board. The heating platens are of extensive length to ensure sufficient curing of the adhesive bond as the board passes over the platens at speeds of up to 300 to 400 meters per minute.

Another characteristic of conventional corrugated board is that of "pressure lines" which result from the pressure applied by the pressure roll at the single facer. This is compounded by "washboarding" which is the effect of the adhesive, when drying, drawing the liner out of its linearity. These effects make the board unsuitable for high quality printing on that side.

SUMMARY OF THE INVENTION

It is an object of this invention to improve the quality of corrugated board and decrease the size of the plant required to produce board at commercially acceptable speeds.

To this end the present invention provides a method of forming corrugated paperboard in which at least one liner is applied to the corrugated medium using low mechanical pressure and the adhesive bonding is achieved with the application of radiant energy at a wavelength for which water, paper and adhesive have a low absorption coefficient. Preferably the wavelength is in the near infrared region of 1.0 to 2.1 microns more preferably 1.0 to 1.5 microns.

The selection of the wavelength range is critical to this invention. Radiant heaters have been proposed previously for curing adhesives in corrugated board and laminates but the wavelengths used have resulted in absorption of the radiant energy near the surface of the paperboard and the heat input into the adhesive layer has been by conduction through the paper. This did not radically improve the speed of bond development and there was little advantage compared to the use of conventional methods of heat input. For example U.S. Pat. Nos. 4,169,007 and 4,589,944 propose the use of I-R radiation in heating corrugated board and adhesives but without avoiding use of pressure or significantly reducing the curing time. U.S. Pat. No. 4,169,007 discloses the use of radiation with wavelengths within the range 2.6 to 3.5 microns for making single face board but without the aforesaid advantages of this invention.

Tabulated data supplied by IR equipment suppliers, show that the percentage energy radiated within the range 1.0 to 1.5 microns and 2.5 to 3.5 microns varies with the peak wavelength transmission as follows.

| Peak wavelength | Source Temperature °C. | % Energy in 1.0–1.5 micron wavelength | % Energy in 2.5 to 3.5 micron range |
| --- | --- | --- | --- |
| 3.04 | 675 | 1.0 | 17.5 |
| 2.64 | 816 | 2.2 | 23.8 |
| 2.35 | 954 | 4.0 | 24.5 |
| 1.75 | 1370 | 13.6 | 21.5 |
| 1.50 | 1650 | 19.4 | 18.2 |
| 1.23 | 2065 | 23.5 | 13.6 |
| 1.05 | 2480 | 28.9 | 9.2 |

An infra-red absorption spectrum, as supplied by the IR lamp suppliers, for a typical paper sheet of 185 gsm basis weight, shows that in the 2.5 to 3.5 micron wavelength range only 5% of the incident radiation is transmitted and 95% is absorbed to generate heat in the paper. In the 1.0 to 2.1 micron wavelength range 41.0% of the incident radiation is transmitted. Based on these figures, 18.2% of the radiant energy is then available for heating and gelling the starch glue, using the preferred 1.0 to 2.1 micron wavelength range, whereas only 0.7% of the radiant energy is available for this purpose in the 2.5 to 3.5 micron range which is the range recommended in U.S. Pat. No. 4,169,007.

Our use of IR is to effectively utilise the transmitted element.

It is a feature of thermal radiation as described by the laws of Stefan-Boltzmann and Wien that the radiant emittance of the source of thermal energy is proportional to the fourth power of the source temperature and that the energy is emitted over a range of wavelengths. The dominant wavelength is inversely proportional to the source temperature.

Infra-red radiation from a thermal source ranging in temperature from 1100° C. to 2300° C. with peak wavelengths ranging between 2.1 and 1.0 microns is the preferred radiation for effectively bonding liners and mediums. At these wavelengths paper, water and adhesives have a low co-efficient of absorption with the energy absorbed increasing with increasing thickness of paper and adhesive film. The radiant thermal energy therefore penetrates deep into the paper structure and into the adhesive film or bead leading to rapid temperature rise of the adhesive and throughout the paper structure and the adhesive. This results in rapid gelling of adhesive and therefore rapid bond development. The high concentration of water in the adhesive film or bead in particular contributes to a high energy absorption and temperature rise in the glue. Totally transmitted radiation is reflected back through the paper layers and the adhesive film or beads by the metal surface against which the paper rests or by reflector plates situated opposite the source of radiant energy.

At 1100° C. to 2300° C. temperature range, the radiant emittance of the source is sufficiently high to effectively bond the product components at required commercially viable operating speeds to make practicable the use of small radiating areas required by the constraints of the commercial corrugator design.

It is preferred that the I-R radiators are disposed axially along the rollers and not tangentially. The amount of energy for bonding may be reduced significantly by locating the lamps axially and parallel to the sheet surface. Such an arrangement allows the bank of I-R lamps to conform to the sheet which passes past the I-R banks. Such conformance results in higher efficiency and has reduced the amount of energy used in bonding by 60%. The facility to conform to curved surfaces allows concentration of the IR beam and application to areas where space is a limitation.

Preferably the air pressure at the face of the board adjacent the radiant energy source should be as close to ambient pressure as possible.

In another aspect of this invention Infra-red radiation is used instead of steam heated rollers to prepare mediums for corrugation.

The traditional method of heating and softening the mediums to assist in their conforming to the flute profiles of the corrugating rolls and maintaining that conformance is to heat the rolls by steam injection into roll bodies. With the use of high intensity infra-red energy applied to the mediums before they enter the corrugating labyrinth equivalent heating and softening of the sheets can be obtained. The high intensity short wavelength unit has a tuning range 1.0 to 2.5 mcirons which is used to optimise the heating and softening of variable thickness paper sheets.

Another advantage is a significant, if not total, reduction in the use of steam for heating corrugating roll bodies and avoiding the need to manufacture the corrugating rolls as pressure vessels. This avoidance also increases the rigidity of the roll bodies and trunnions so reducing roll vibration.

The use of high intensity electrical energy does involve installation of additional transformer capacity, cabling and switchgear.

Conventionally starch or starch based water soluble adhesives have been used for bonding corrugated boards. Starch adhesives are quite acceptable for use with the present invention and curing times are greatly decreased. However, polymeric adhesives are also suitable and provide an adequate bond comparable or superior to that of starch based adhesives.

The various aspects of this invention are applicable to conventional corrugated board manufacture but is also applicable to the production of unconventional board having two intermediate corrugated mediums bonded at their flute tips. This type of board and methods of manufacture are described in European Patent Specifications 213957, 279609 and Applications 88311884.6 and 89903961.4.

BRIEF DESCRIPTION OF THE DRAWINGS

The invention will be further explained with reference to the drawings in which.

Figure 1:
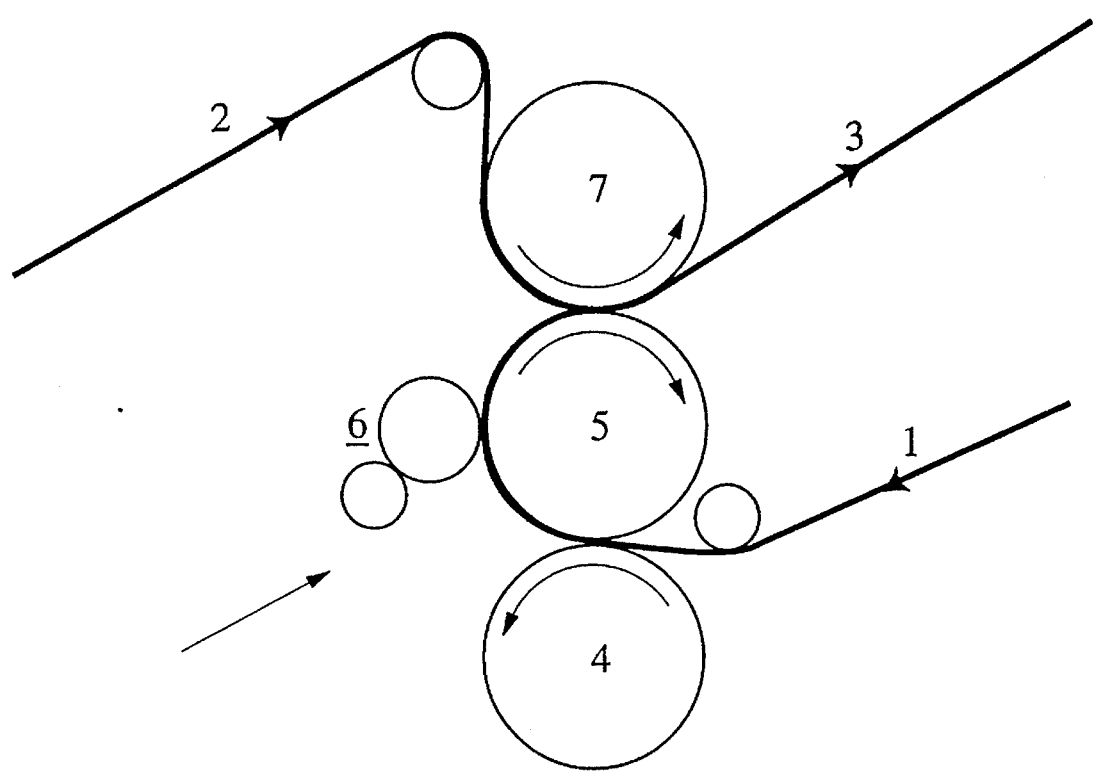
FIG. 1 is a schematic view of a recently proposed conventional single facer unit.

In the conventional single facer of FIG. 1 a medium 1 is corrugated between the corrugating rolls 4 and 5. Adhesive is applied to the flutes of medium 1 at adhesive applicator station 6 and a liner board 2 is then passed around pressure roller 7 to press the liner 2 onto the fluted medium 1 to form the single faced board 3.

DESCRIPTION OF THE PREFERRED EMBODIMENTS

The product of this process exhibits the pressure lines.

Figure 2:
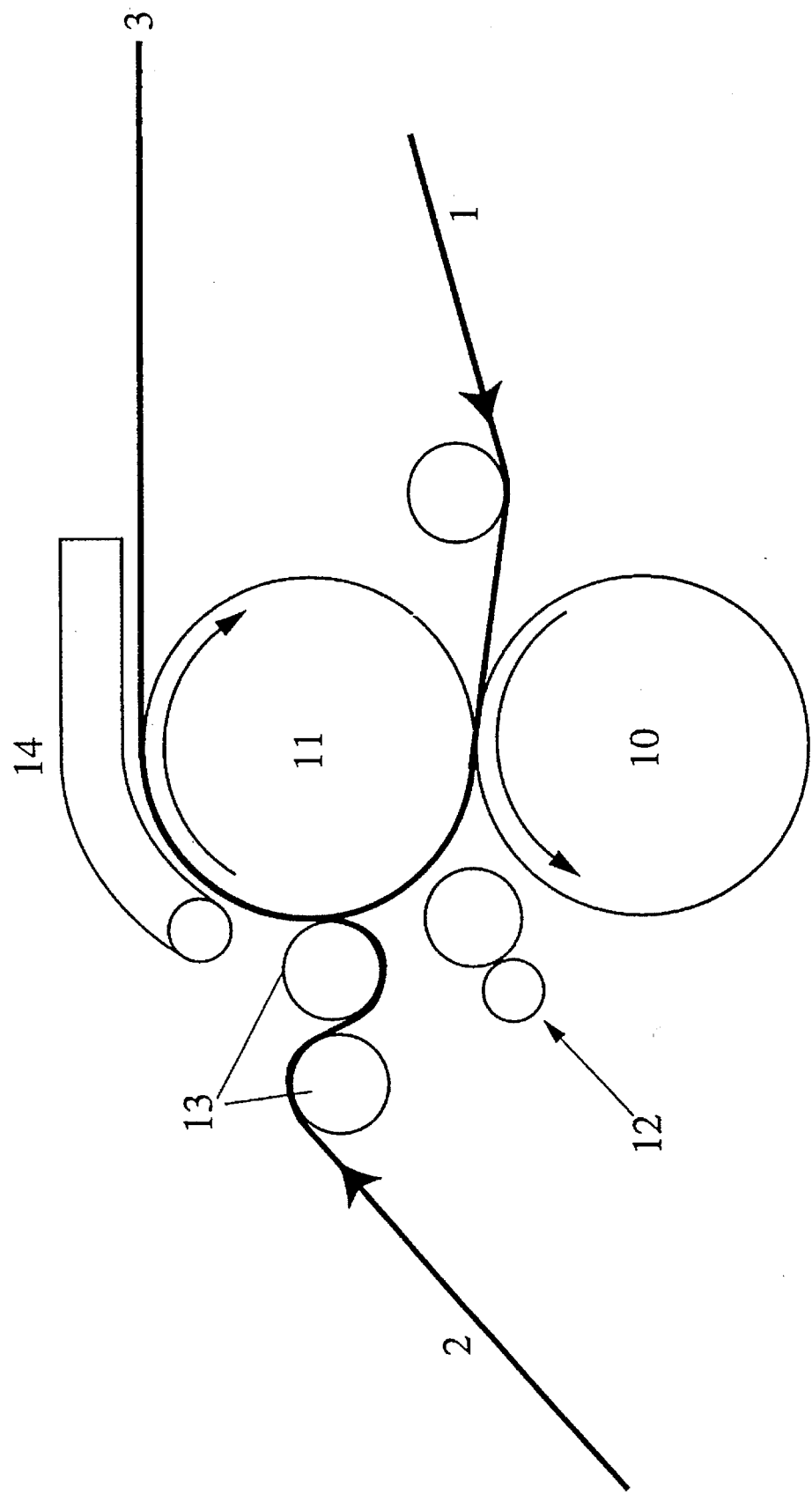
FIG. 2 is a schematic view of the single facer unit according to this invention and FIG. 3 illustrates schematically the formation of an unconventional double wall board having two corrugated mediums bonded at their flute tips without an intermediate liner.

In FIG. 2 the medium 1 is passed in the usual way through the nip of corrugating rolls 10 and 11 and subsequently adhesives applied to the flutes of medium 1 by the adhesive applicator 12. The medium 1 is heated by an I-R radiator 14 of this invention prior to entering the corrugating labrynth between corrugating rolls 10 and 11.

A liner board 2 is passed over the S-wrap rollers 13 to contact and lightly adhere to the fluted medium 1. The adhesive bond between the medium 1 and liner 2 is bonded by using an I-R heater 14 of this invention which has a face shaped to conform to the surface of the liner as it passes over the corrugating roll 11. The heater 14 extends axially parallel to the roll 11. The single faced board 3 is thus formed without the application of excess pressure or the creation of pressure lines in the single faced board.

Figure 3:
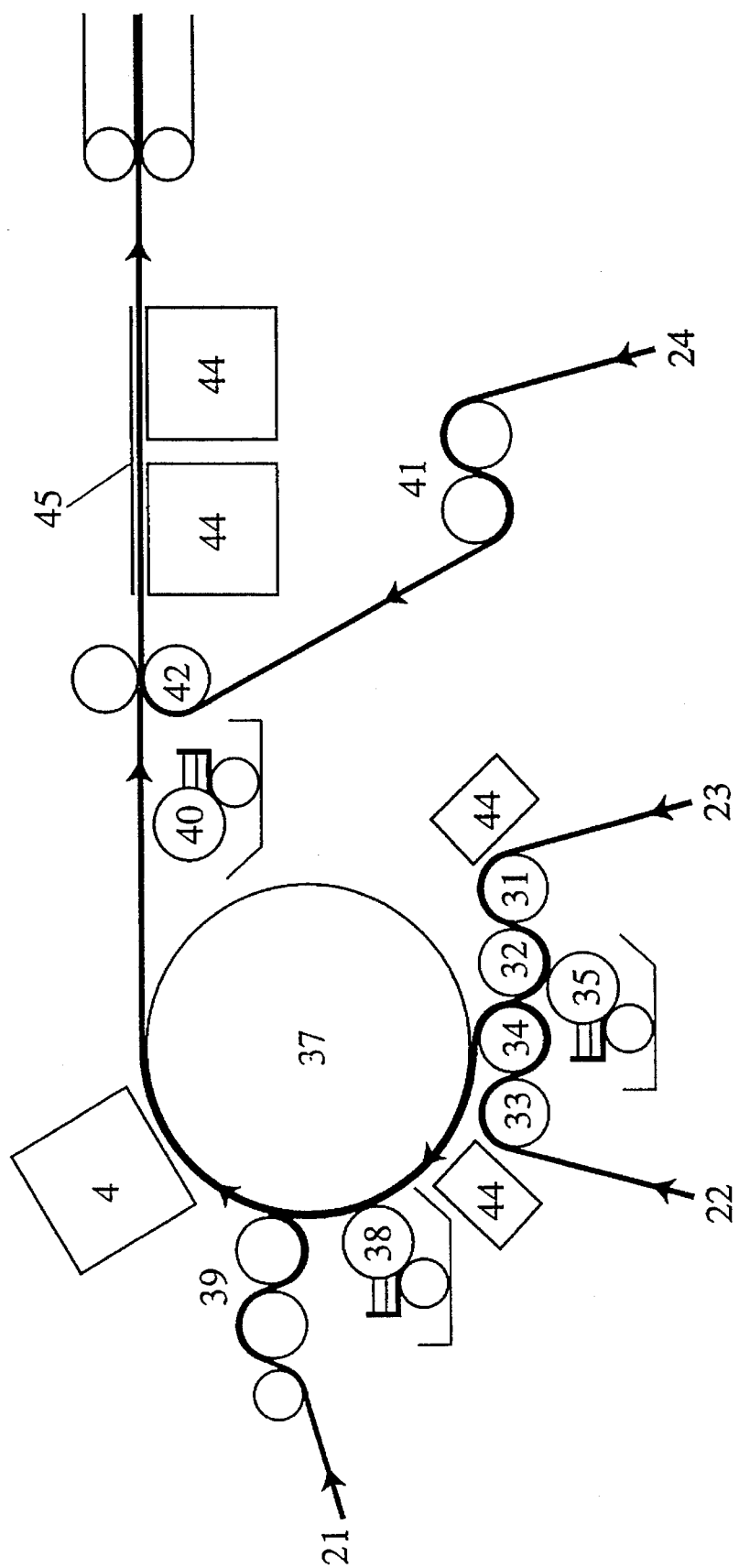

In FIG. 3 the production of unconventional board is illustrated in which the two mediums 22 and 23 are bonded together and the liner boards 21 and 24 respectively are in turn bonded to the joined mediums as disclosed in European Patent 213957.

The two mediums 22 and 23 are corrugated on corrugating rolls 33 and 34 and 31 and 32 respectively. I-R radiators 44 which are axially aligned and shaped to conform to the surface of the corrugating rollers, are disposed adjacent corrugators 31 and 33 to preheat and soften the mediums 23 and 22 respectively prior to corrugation. As medium 23 passes over the roller 32 adhesive is applied by adhesive station 35. Mediums 22 and 23 are then bonded together at their flute tips by passing through the nip of synchronised rollers 32 and 34 and the joined mediums are then passed onto the carrier roll 37. Adhesive is applied to the outer medium 22 at the adhesive station 38 and the liner 21 is brought into low pressure contact with the mediums by feeding through a series of feed rolls including S-wrap rolls 39.

After applying the liner the mediums and liner are then carried by carrier roll 37 past the radiant energy station 44 which is axially aligned above the carrier roll 37, The I-R radiators 44 are shaped to conform to the contour of the roll 37.

The adhesive used by adhesive applicator 12 in FIG. 2 or adhesive applicators 32 and 38 in FIG. 3 may be starch or a polymeric adhesive. Alternatively thermoplastic film capable of bonding paperboard may be fed between the nip of corrugating rolls 10 and 11 in FIG. 2 or 32 and 34 in FIG. 3 and subsequently subjected to I-R radiation to melt the film into an adhesive layer. Similarly a polymer film may be fed with the liner board 2 in FIG. 2 or liner 21 in FIG. 3 and thus do away with the adhesive stations.

It should be noted that the apparatus as shown in FIG. 3 can be used to make conventional corrugated board by simply not using corrugating rollers 31 and 32.

The radiant energy sources 14 in FIG. 2 and 44 in FIG. 3 are incandescent sources at 2100° C. emitting in a wavelength range centred at 1.2 μm. The surface of the carrier roll 37 acts as a reflector.

The I-R lamps are preferably located at a distance of 30–40 mm from the surface of the liner being bonded. Cooling air may be supplied to the lamps to prolong lamp life and provide rapid cooling down and should have an exit air pressure in the range zero to 70 mm water gauge.

Zero pressure I-R units or "closed face" bonding units which draw in air at the operating face are an alternative which are judged to be equally effective or more effective than the I-R units cooled by air forced from within the units and discharging onto the sheet.

After leaving the carrier roll 37 adhesive is applied to exposed medium 23 and a liner 24 is applied to the single faced double flute structure by roll 42, The liner 24 is brought to the roll 42 over a conventional array of rollers including S-wrap feed rollers 41.

The adhesive bond is formed by use of the radiant heaters 44 as described above.

In the case of the second liners a reflector plate 45 is used to reflect radiation back on to the corrugated board, Preferably an air cushion is created over the surface of the reflector plate 45 to protect the reflective coating from abrasion by the corrugated board.

At speeds of 80 to 100 meters per minute bonding times of less than a second can be achieved compared to conventional bonding times of up to 4 seconds at the double backer station.

By the use of this invention the liner medium bonds do not exhibit "pressure lines" or "wash boarding" and both sides of the double wall board are suitable for printing.

The key process advantages are:
1. Absence of the steam heated platen unit which occupies extensive floor space on the conventional line.
2. Absence of the "bridge" between single facer and double backer which requires transfer belts and facilities to assist feeding to the double backer. Both advantages 1 and 2 allow a much smaller floor area to be used.
3. Reduced losses as a conventional machine stoppage results in board remaining in the steam platen area and overheating to lose required quality.
4. Reduced adhesive usage compared to conventional double backers.

The claims defining the invention are as follows:

1. A method of forming a corrugated paperboard laminate in which at least one paperboard liner is applied to a corrugated paperboard medium, consisting essentially of applying an adhesive to at least said liner and said corrugated paperboard medium wherein said adhesive and paperboard have a low absorption coefficient for thermal radiant energy ranging from 1100° to 2300° C. and emitting a dominant wavelength between 2.1 and 1.0 microns, bringing together said liner and said corrugated paperboard medium, exposing said liner and said corrugated paperboard medium to a thermal radiant energy source ranging from 1100° to 2300° C. and emitting a dominant wavelength between 2.1 and 1.0 microns to render the adhesive effective, whereby the speed of bond development between said corrugated paperboard medium and said liner is improved and bonding is achieved at low mechanical pressure.

2. The method according to claim 1 wherein said radiant energy source is an infra-red source which is aligned parallel to said paperboard liner.

3. The method according to claim 1 wherein said thermal radiation energy source has a face, said liner has a surface, said thermal energy source is located at a distance of 30–40 mm from said liner and the face has a shape which conforms to the surface of said liner.

4. The method according to claim 1 wherein said paperboard liner and said corrugated paperboard medium have low absorption coefficient for said radiation when said radiant energy source is in said range from 1100° C.–2300° C. and said wave length is between 2.1 and 1.0 microns, whereby 41.0% of said radiation is transmitted and 18.2% of said radiation energy is available to heat said adhesive.

5. The method according to claim 1 wherein the wavelength of the radiant energy is between 1.0 and 1.5 microns.

6. A method of forming a corrugated paperboard laminate having two corrugated paperboard mediums bonded together at their flute tips and at least one paperboard liner, said paperboard mediums having an external surface, said liner being bonded to said external surface of at .least one of said paperboard mediums, wherein said bonds between said corrugated paperboard mediums and between said paperboard liner and the external surface of at least one of said corrugated paperboard mediums are formed by applying an adhesive to at least one of said mediums and said liner to be bonded wherein said paperboard and said adhesive have a low absorption coefficient for thermal radiant energy ranging from 1100° to 2300° C. and emitting a dominant wavelength between 2.1 and 1.0 microns, bringing together at least one said medium and said liner to be bonded, exposing said at least one medium and said liner brought together to a radiant heat energy source ranging from 1100° C. to 2300° C. and emitting a dominant wavelength of between 2.1 and 1.0 microns to render the adhesive effective, whereby the speed of bond development between said corrugated mediums and at least one liner is improved and bonding is achieved using low mechanical pressure.

7. The method according to claim 6 wherein said paperboard mediums are corrugated by corrugating rollers, said corrugating rollers have a surface, said radiant heat energy source is shaped to conform to said surface of said corrugating rollers.

8. The method according to claim 6 wherein said liner has a surface, said radiant heat energy source is located at a distance of 30–40 mm from the surface of said liner.

9. The method according to claim 6 wherein the wavelength of the radiant energy is between 1.0 and 1.5 microns.

\* \* \* \* \*